(12) United States Patent
Iijima

(10) Patent No.: US 8,270,156 B2
(45) Date of Patent: Sep. 18, 2012

(54) ELECTRONIC DEVICE

(75) Inventor: Takashi Iijima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/100,604

(22) Filed: May 4, 2011

(65) Prior Publication Data
US 2011/0205699 A1   Aug. 25, 2011

Related U.S. Application Data

(63) Continuation of application No. 12/285,876, filed on Oct. 15, 2008, now Pat. No. 7,961,464.

(30) Foreign Application Priority Data

Mar. 27, 2008   (JP) .................................. 2008-083925

(51) Int. Cl.
*H05K 7/20* (2006.01)
(52) U.S. Cl. ............... 361/679.51; 361/679.48; 361/695
(58) Field of Classification Search ......................... None
See application file for complete search history.

(56) References Cited

U.S. PATENT DOCUMENTS

| | | | |
|---|---|---|---|
| 4,571,456 A | | 2/1986 | Paulsen et al. |
| 5,313,362 A * | | 5/1994 | Hatada et al. ................. 361/709 |
| 5,694,294 A | | 12/1997 | Ohashi et al. |
| 6,097,595 A | | 8/2000 | Cipolla |
| 6,309,178 B1 * | | 10/2001 | Kim et al. ..................... 415/176 |
| 6,437,978 B1 * | | 8/2002 | Ozaki et al. ............. 361/679.46 |
| 6,493,222 B2 | | 12/2002 | DiFonzo et al. |
| 6,599,090 B2 | | 7/2003 | Ozaki et al. |
| 7,019,968 B2 * | | 3/2006 | Kitahara ....................... 361/695 |
| 7,539,009 B2 | | 5/2009 | Hata et al. |
| 7,701,715 B2 | | 4/2010 | Suzuki et al. |
| 2002/0012228 A1 | | 1/2002 | Ozaki et al. |
| 2002/0018337 A1 * | | 2/2002 | Nakamura .................... 361/697 |
| 2003/0007322 A1 * | | 1/2003 | Amemiya et al. ............ 361/683 |
| 2006/0114653 A1 * | | 6/2006 | Seto et al. .................... 361/695 |
| 2008/0002357 A1 * | | 1/2008 | Makley et al. ................ 361/687 |

(Continued)

FOREIGN PATENT DOCUMENTS

CN   2671004 Y   1/2005

(Continued)

OTHER PUBLICATIONS

Chinese Office Action, mailed by Chinese Patent Office and corresponding to Chinese Application No. 200810174110.4 on Mar. 17, 2011, with English translation.

(Continued)

*Primary Examiner* — Courtney Smith
(74) *Attorney, Agent, or Firm* — Fujitsu Patent Center

(57) ABSTRACT

An electronic device that includes a cabinet having a top face, an undersurface, and a side that completely surrounds the top face and the undersurface by connecting the outer edge of the top face and the outer edge of the undersurface together; and an electronic part disposed inside the cabinet, wherein the cabinet has an exhaust hole provided in the undersurface of the cabinet, at a position distant from the side of the cabinet; a fan disposed inside the cabinet, which blows air inside the cabinet from the exhaust hole; and at least one protrusion disposed at the back of the undersurface of the cabinet, protruding from the undersurface of the cabinet and holding the cabinet placed on a flat plate in a state of being lifted.

4 Claims, 8 Drawing Sheets

U.S. PATENT DOCUMENTS

2009/0323266 A1     12/2009    Mizuno

FOREIGN PATENT DOCUMENTS

| | | |
|---|---|---|
| CN | 201041983 Y | 3/2008 |
| EP | 1006426 A3 | 8/2000 |
| JP | 3-297198 A | 12/1991 |
| JP | 08-263162 A | 10/1996 |
| JP | 10-270879 A | 10/1998 |
| JP | 2000-227824 A | 8/2000 |
| JP | 2001-007580 A | 1/2001 |
| JP | 2001-345588 A | 12/2001 |
| JP | 2005-165637 A | 6/2005 |
| JP | 2005-317877 A | 11/2005 |
| JP | 2008-028331 A | 2/2008 |

OTHER PUBLICATIONS

USPTO, [SMITH] "U.S. Appl. No. 12/285,876 (parent)," [CTFR] Final Rejection issued on Oct. 28, 2010.

USPTO, [SMITH] "U.S. Appl. No. 12/285,876 (parent)," [CTNF] Non-Final Rejection issued on Mar. 18, 2010.

USPTO, [SMITH] "U.S. Appl. No. 12/285,876 (parent)," [CTAV] Advisory Action issued on Feb. 8, 2011.

USPTO, [SMITH] "U.S. Appl. No. 12/285,876 (parent)," [NOA] Notice of Allowance and Fees Due issued on Mar. 23, 2011.

Japanese Office Action, mailed on Feb. 15, 2011 for corresponding Japanese Application No. 2008-083925.

Japanese Office Action, mailed on Feb. 23, 2010 for corresponding Japanese Application No. 2008-083925.

Japanese Office Action, mailed on Oct. 5, 2010 for corresponding Japanese Application No. 2008-083925.

Korean Office Action, mailed by Korean Patent Office and corresponding to Korean Application No. 2008-0105118 on Mar. 19, 2010, with English translation.

"Japanese Office Action" mailed by JPO and corresponding to Japanese application No. 2010-271745 on May 8, 2012, with partial English translation.

"Chinese Office Action", mailed by China Patent Office and corresponding to Chinese application No. 200810174110.4 on Apr. 5, 2012, with partial English translation.

\* cited by examiner

ELECTRONIC DEVICE

CROSS-REFERENCE TO RELATED APPLICATION

This application is based upon and claims the benefit of priority of the prior Japanese Patent Application No. 2008-83925, filed on Mar. 27, 2008, the entire contents of which are incorporated herein by reference.

FIELD

An embodiment discussed herein is directed to an electronic device equipped with a cabinet and electronic parts disposed inside the cabinet.

BACKGROUND

Generally, electronic devices incorporate various kinds of electronic parts inside a box-shaped cabinet to realize features corresponding to the electronic devices. Some of these electronic devices incorporate electronic parts that generates heat inside the cabinet, thereby adopt a structure in which a cooling fan is provided to cool down the electronic parts and prevent the temperature inside the cabinet from becoming high with the heat generated from the electronic parts and further an exhaust hole is provided in the cabinet so that the air heated by depriving the heat from the heat-producing electronic parts can be discharged from the exhaust hole.

For example, a notebook type personal computer (hereinafter, abbreviated as note PC) is internally equipped with a CPU, other heat-producing electronic parts, and many various kinds of electronic parts, and has a main unit equipped with a keyboard on the top face and a display unit equipped with a display screen hinge-mounted to the main unit to open and close freely. And the main unit incorporates a fan to cool down the CPU and the other heat-producing electronic parts, and is configured to discharge air from the exhaust hole provided in the sides of the cabinet or the like of the main unit.

The recent trend of ever more advanced functions and miniaturization of the note PC poses a problem about the position of the exhaust hole in the cabinet of the main unit. Generally, the left and right sides of the main unit cabinet is quite packed with various kinds of parts provided thereat, for example, such as a CD/DVD mounting port, a memory card loading port, various types of connectors, and an audio jack. Also, since the sides at the back of the main unit cabinet are similarly packed and a battery for driving the note PC is often placed at the back of the main unit, and in that case, the placement of a connector or the like in the sides of the back of the cabinet can be considerably limited. Since there is an operator at the front side of the main unit cabinet, it is impossible to discharge the heated air from the sides of the front side.

Under such circumstances, the number of parts disposed in the sides of the cabinet tends to increase with ever more advanced features, which makes it very difficult to secure a space for forming an exhaust hole of sufficient width, since area of the sides is becoming smaller with the advancement of miniaturization and slimness. This trend is common not only in the note PCs, but also in various types of electronic devices. See, for example, Japanese Laid-open Patent Publication Nos. 10-270879, 2000-227824, and 2001-345588.

SUMMARY

According to an aspect of the invention, an electronic device includes a cabinet having a top face, an undersurface, and a side that completely surrounds the top face and the undersurface by connecting the outer edge of the top face and the outer edge of the undersurface together; and an electronic part disposed inside the cabinet, wherein the cabinet has an exhaust hole provided in the undersurface of the cabinet, at a position distant from the side of the cabinet; a fan disposed inside the cabinet, which blows air inside the cabinet from the exhaust hole; and at least one protrusion disposed at the back of the undersurface of the cabinet, protruding from the undersurface of the cabinet and holding the cabinet placed on a flat plate in a state of being lifted.

Additional objects and advantages of the invention will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF EMBODIMENT(S)

An embodiment of the present invention will be described below with reference to the accompanying drawings.

Figure 1:
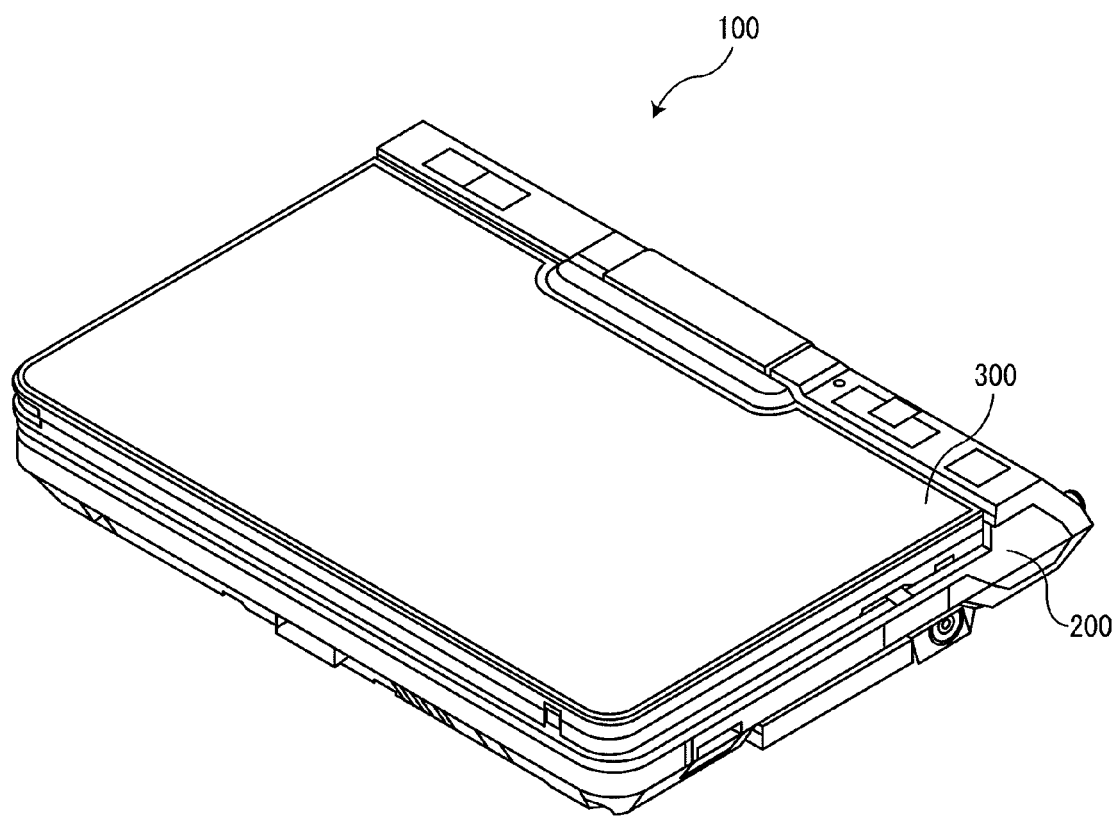
FIG. 1 is a perspective view illustrating the outlook of a note PC.

FIG. 1 is a perspective view of the outlook of a note PC. Here, this note PC will be explained as one embodiment of the electronic device.

This note PC has a main unit equipped with a keyboard on the top face and a display unit equipped with a display screen. This note PC is so-called a convertible type which has a closed state where the display unit is closed with the display screen facing the keyboard (a first closed state illustrated in FIG. 1), an open state where the display unit stands with the display screen facing the front side, and further, a second closed state where the display unit is closed on the main unit with the display screen facing upward.

Figure 2:
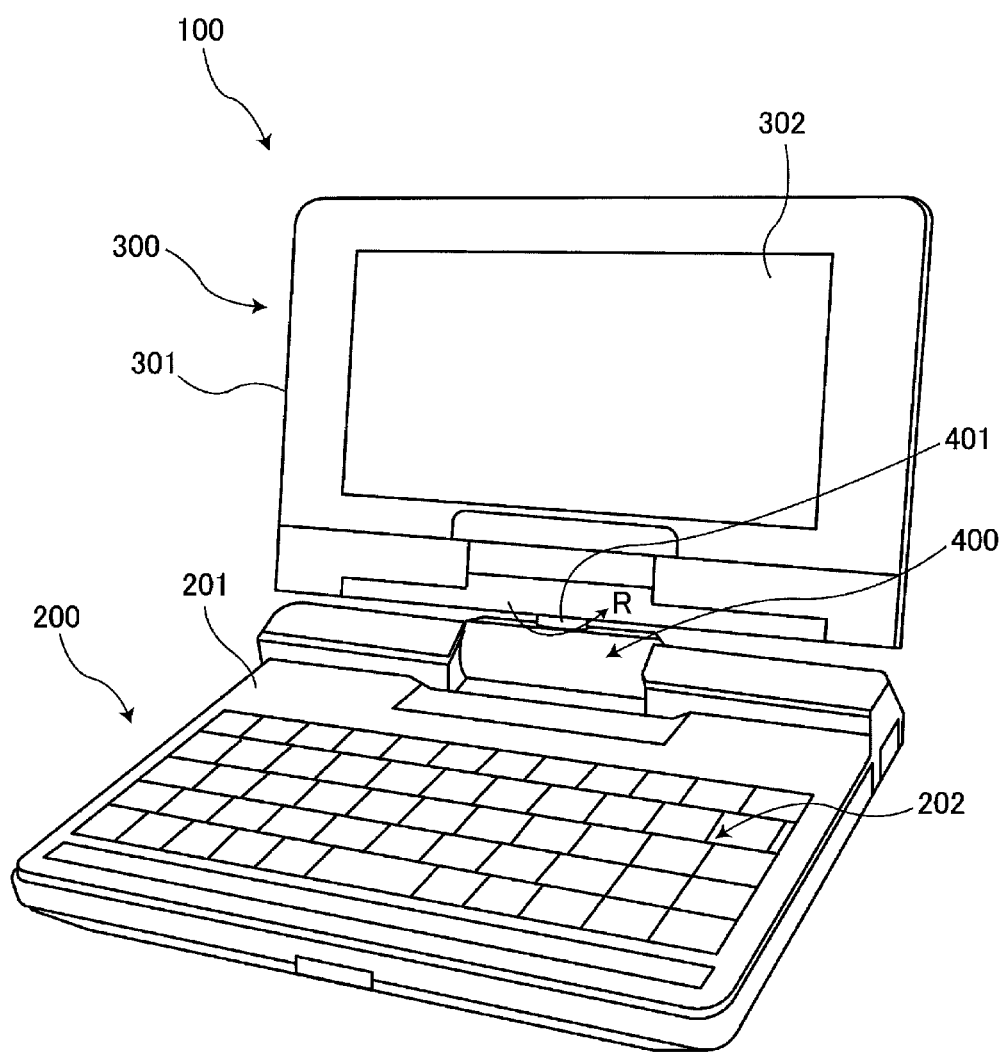
FIG. 2 is a drawing illustrating an open state of the note PC.
Figure 3:
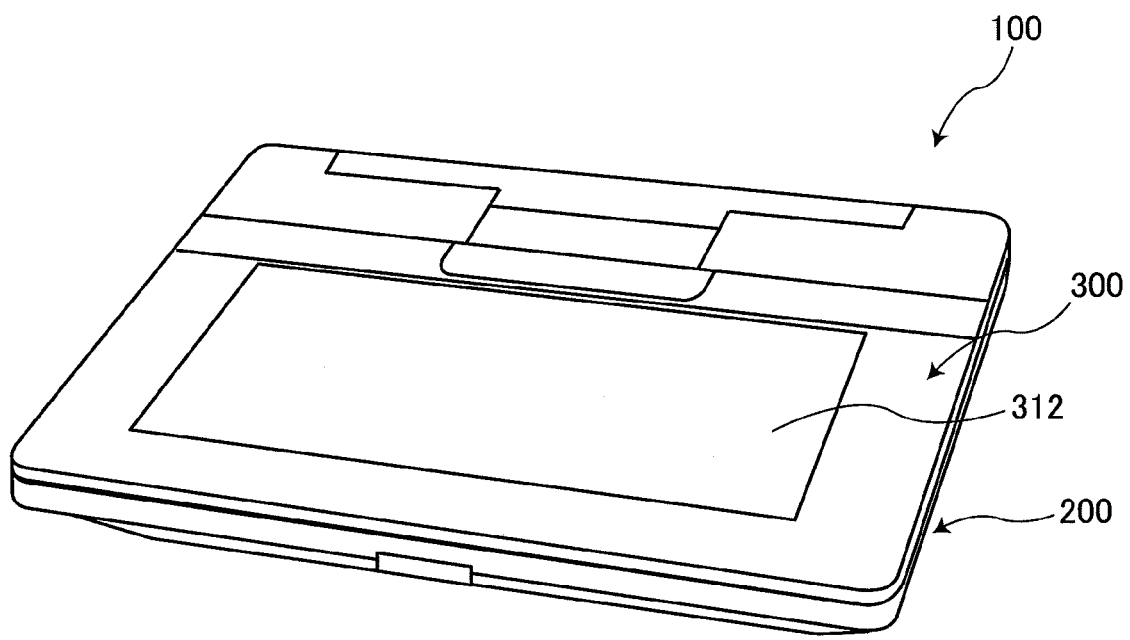
FIG. 3 is a drawing illustrating a second closed state of the note PC.
Figure 4:
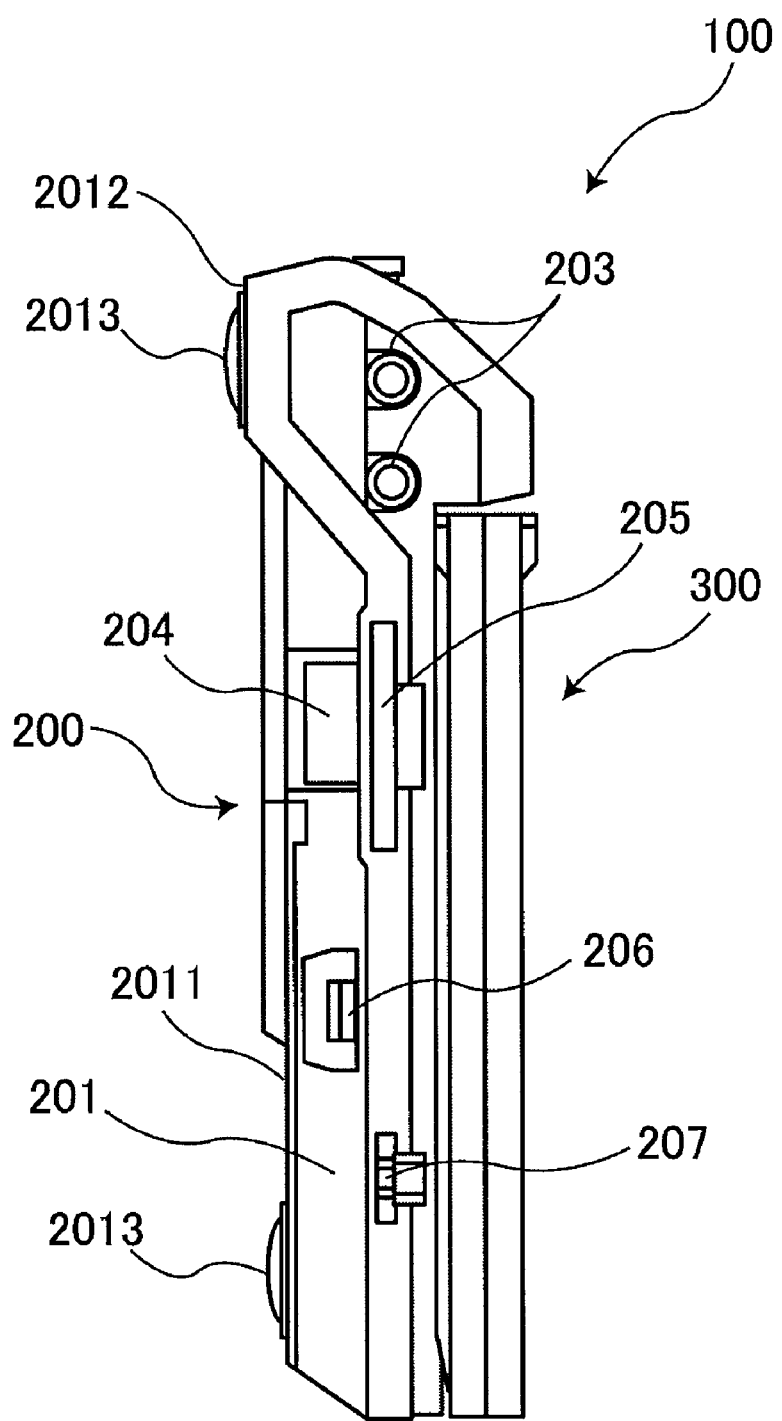
FIG. 4 is a drawing illustrating the left side of the note PC in the first closed state (the state illustrated in FIG. 1)
Figure 5:
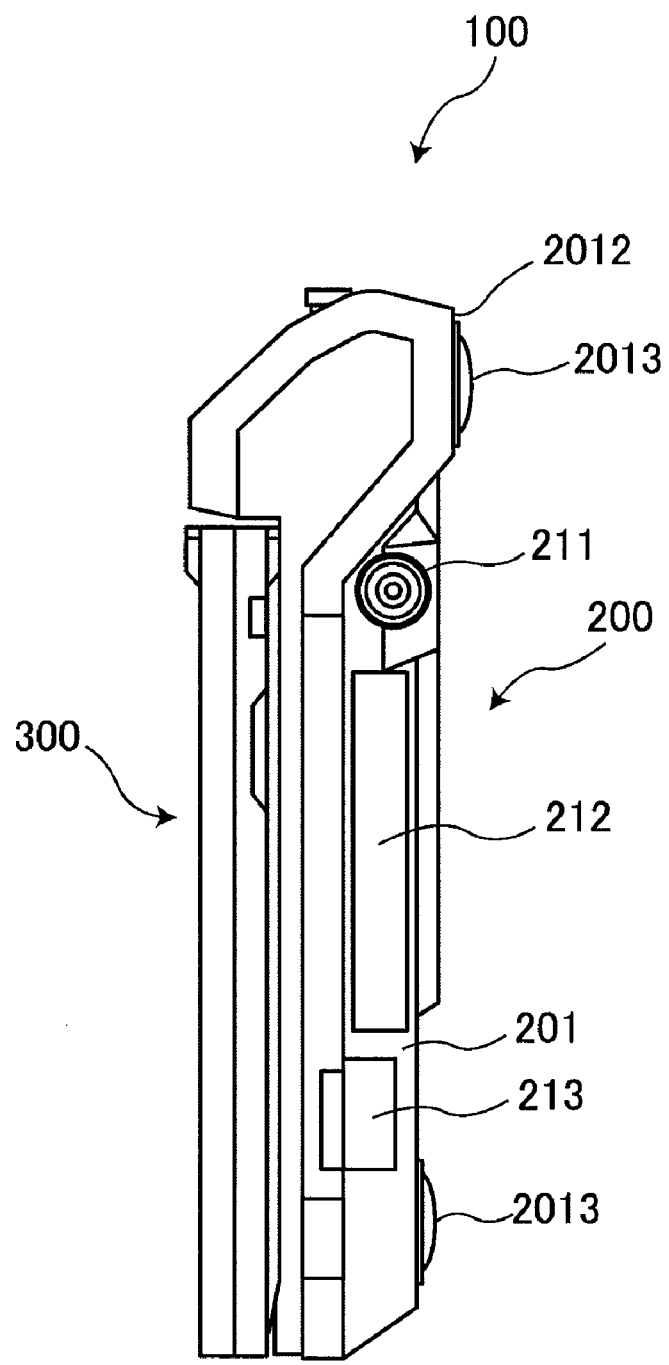
FIG. 5 is a drawing illustrating the right side of the note PC in the first closed state (the state illustrated in FIG. 1)
Figure 6:
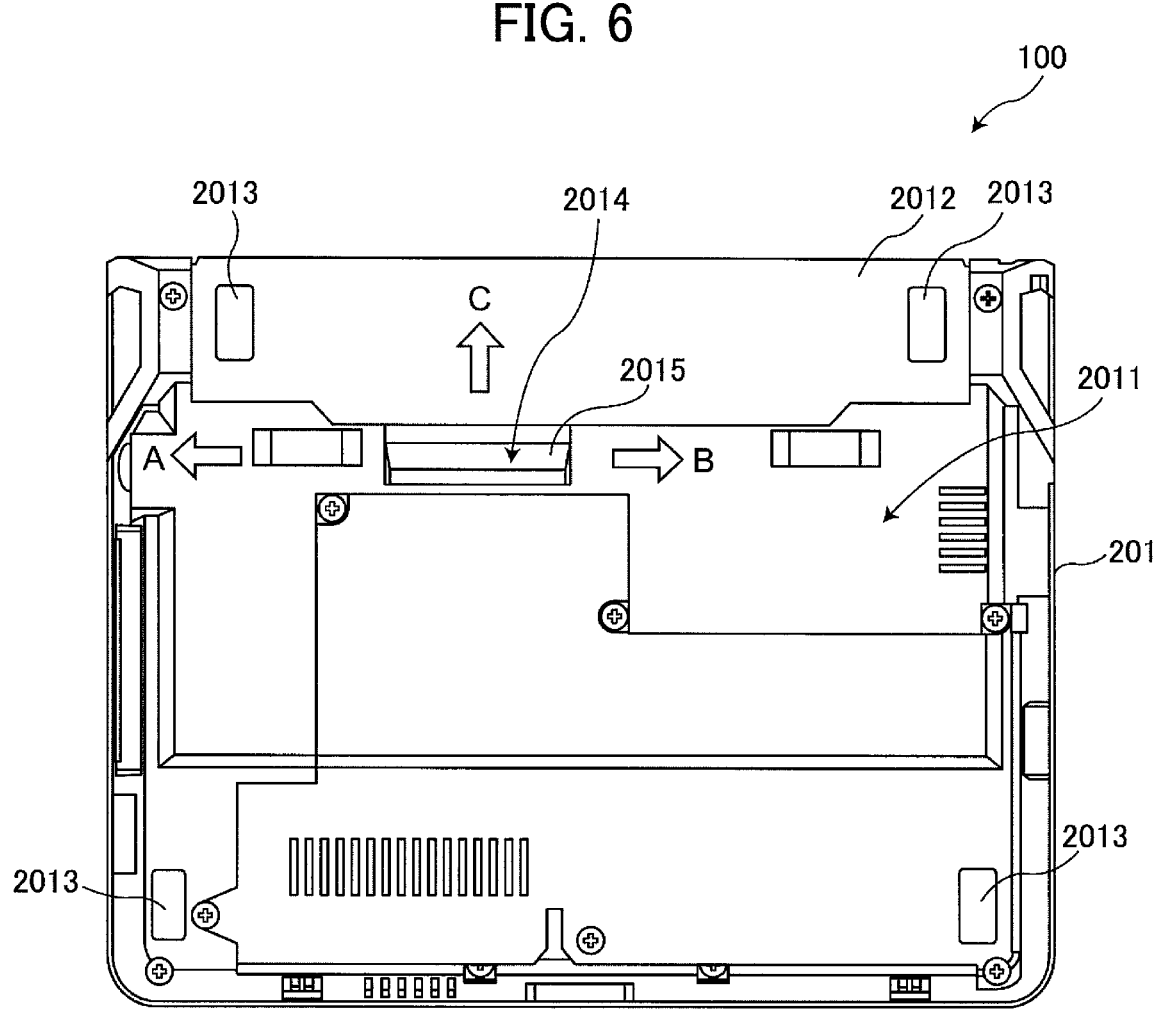
FIG. 6 is a drawing illustrating the undersurface of the note PC.

FIG. 2 is a drawing illustrating an open state of the note PC in FIG. 1; FIG. 3 is a drawing illustrating a second closed state of the note PC in FIG. 1; FIGS. 4, 5 are drawings illustrating the left and right sides of the note PC respectively in the first closed state (the state illustrated in FIG. 1); and FIG. 6 is a drawing of the undersurface of the note PC in FIG. 1.

A note PC 100 illustrated in these FIGS. 1 to 6 has a main unit 200 and a display unit 300. The display unit 300 is connected to the main unit 200 via a biaxial connecting unit 400 illustrated in FIG. 2, which enables opening and closing between the first closed state illustrated in FIG. 1 and the open state illustrated in FIG. 2 as well as rotates the display unit 300 a half-turn around an axis 401 of the connecting unit 400 in the direction indicated by the arrow R to close the display unit 300 on the main unit 200 as illustrated in the second closed state in FIG. 3.

The main unit 200 has the top face equipped with a keyboard 202, the undersurface that is the bottom surface of this note PC, and a side that completely surrounds the top face and the undersurface by connecting the edges of the top face and the undersurface together. A main unit cabinet 201 incorporates heat-producing electronic parts such as a CPU and many other electronic parts.

In addition, the display unit 300 has a display unit cabinet 301 and a display screen 312, and in the first closed state illustrated in FIG. 1, the display screen 302 is closed on the main unit 200 with the display screen 302 facing the keyboard 202, while in the second closed state illustrated in FIG. 3, the display screen 302 is closed on the main unit 200 in such a manner that the rear surface relative to the display screen 302 of the display unit cabinet 301 faces the keyboard 202 so that the display screen 302 appears outside.

On the left side of the main unit cabinet 201, as illustrated in a left side drawing in FIG. 4, there are disposed audio jacks 203 for microphone and headphone, an USB connector 204 complying with the USB standard, a SD card slit 205 through which a SD card as a type of memory cards is inserted, a hole 206 for security lock, an audio volume controller 207 or the like.

Incidentally in this FIG. 4, a bulge 2012 that bulges out at the back of an undersurface 2011 of the main unit cabinet 201 is illustrated, and protrusions 2013 that serve as supporter when this note PC 100 is put on the floor is also illustrated. The protrusions 2013 are provided on both sides, at the front and back of the main unit cabinet 201, and the protrusion 2013 at the back is provided at the position overlapping the bulge 2012.

Additionally, on the right side of the main unit cabinet 201, as illustrated in a right side drawing in FIG. 5, there are disposed a power terminal 211, a CF card slit 212 through which a CF card for communication is inserted, a small USB (mini USB) connector 213, and others.

Also in this FIG. 5, the bulge 2012 that bulges out at the back of the undersurface 2011 of the main unit cabinet 201 and the protrusions 2013 are illustrated as in FIG. 4.

Moreover, on the undersurface 2011 of the main unit cabinet 201, as illustrated in a drawing of undersurface in FIG. 6, the above-described bulge 2012 and the protrusions 2013 are illustrated and furthermore, an exhaust hole 2014 is illustrated.

The bulge 2012 has a shape of extending to the left and right at the back of the main unit cabinet 201 and bulging from the undersurface. In all, four protrusions 2013 are disposed, each at the left and right of both the front and backsides respectively, wherein the two protrusions 2013 at the back are disposed in a position overlapping the bulge 2012, each at both the left and right of the bulge 2012. These protrusions 2013 serve to hold the undersurface 2011 in the main unit cabinet 201 of this note PC 100 in a state of being lifted from the floor when this note PC 100 is put on the top of a desk or the like. In the present embodiment, multiple protrusions are provided to be spaced out from each other, however, it is also possible to attain the same effect with one protrusion depending on shape and placement of the protrusion.

Moreover, the exhaust hole 2014 is formed adjacent to the bulge 2012, at a position nearer to the front side than the bulge 2012 and is distant from any sides surrounding the main unit cabinet 201. A guide member 2015 is provided within this exhaust hole 2014. This guide member 2015 will be explained together with an explanation of FIGS. 7, 8.

As illustrated in FIG. 6, a cover that can be removed by taking off a screw is provided for the undersurface 2011 of the main unit cabinet 201 to enable the repair and replacement of internal parts, which however, is not the subject here and a detailed explanation is omitted. Although several parts are provided inside the cover, there is more extra space in this undersurface 2011 than in the sides and the exhaust hole 2014 of sufficient width is also formed.

Figure 7:
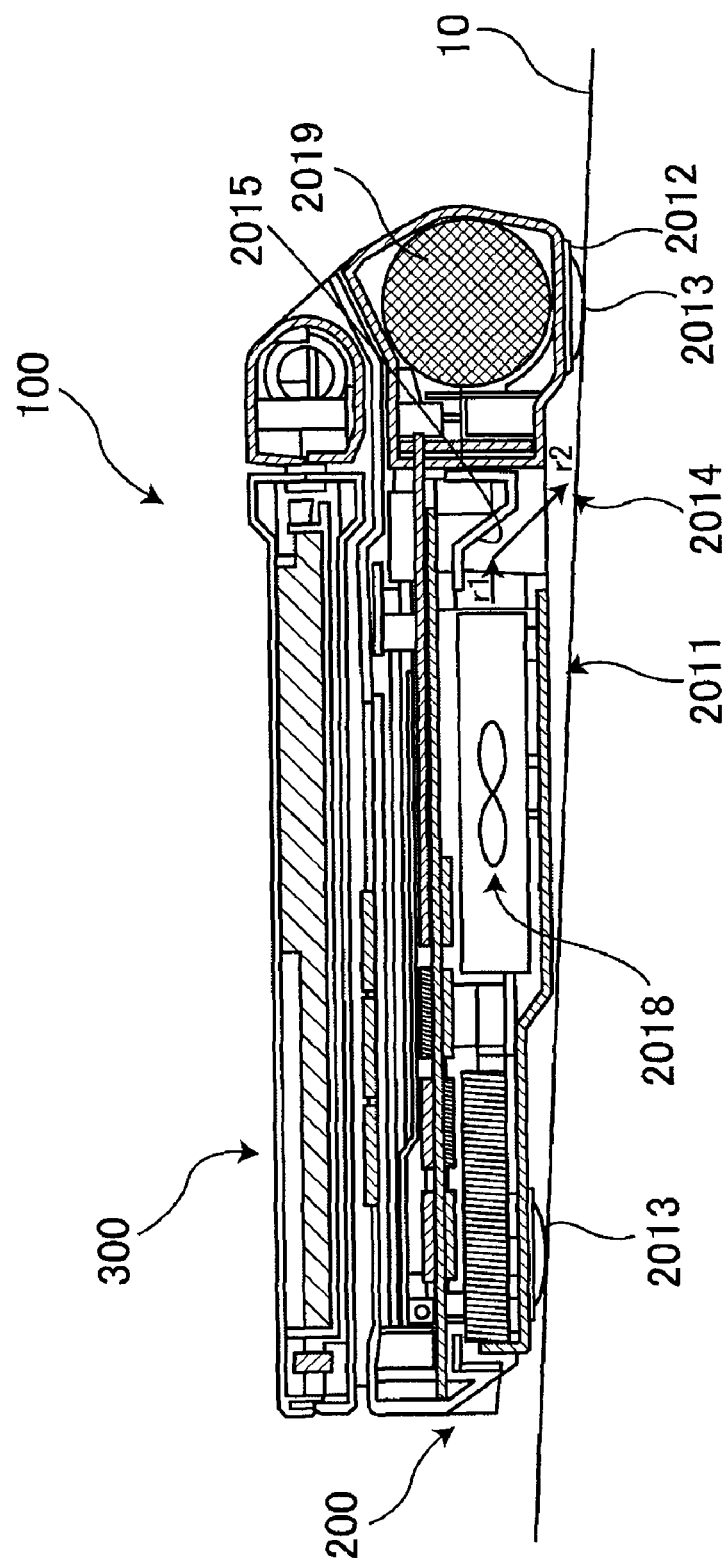
FIG. 7 is a cross-sectional view of the note PC.

FIG. 7 is a cross-sectional view of the note PC illustrated in FIGS. 1 to 6, and FIG. 8 is a cross-sectional perspective view of the main unit cabinet of the note PC illustrated in FIGS. 1 to 6.

Figure 8:
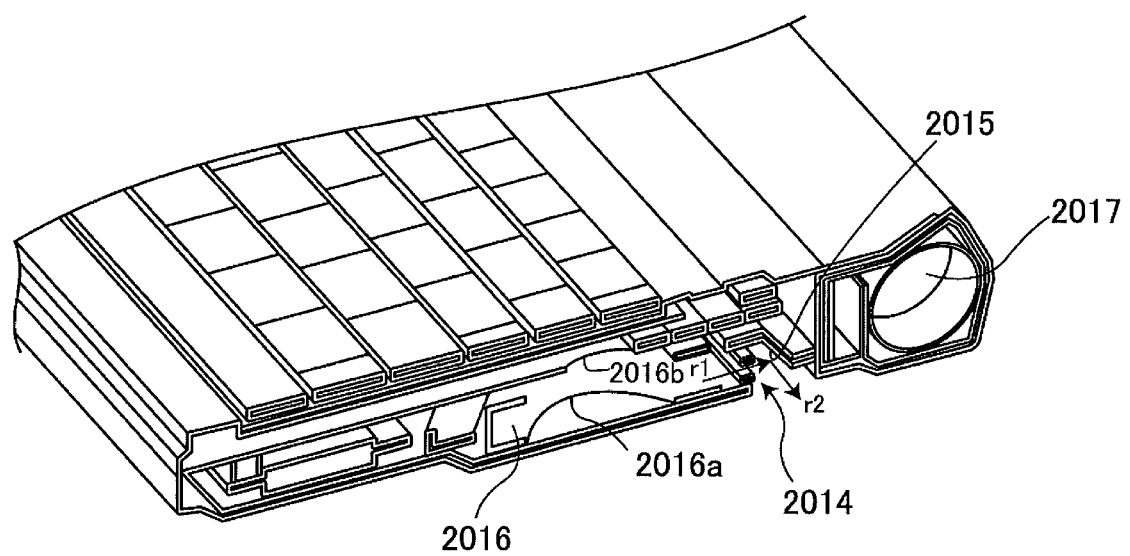
FIG. 8 is a cross-sectional perspective view of the main unit cabinet of the note PC.

Both FIG. 7 and FIG. 8 illustrate a cross-section of the exhaust hole 2014 from the front side toward the back of the note PC 100.

In a fan placement space 2016 and a battery placement space 2017 in the main unit cabinet 201 illustrated in FIG. 8, a fan 2018 and a battery 2019 are disposed respectively as illustrated in FIG. 7.

The bulge 2012 that bulges on the undersurface 2011 of the main unit cabinet 201 serves to secure space for disposing the battery 2019. Additionally, with the four protrusions 2013 provided on the undersurface 2011 of the main unit cabinet 201, the undersurface 2011 is held in a state of being lifted from a floor surface 10. Since the protrusions 2013 at the back are placed in a position overlapping the bulges 2012, this note PC 100 is held slightly askew to the front side when placed on the floor, which enhances the operability of the keyboard and also serves to make a space between the undersurface 2011 and the floor surface 10 wider at the back to guide the air discharged from the exhaust hole 2014 to the back.

In addition, the fan placement space 2016 has openings 2016a, 2016b above and below thereof. The fan 2018 disposed in this fan placement space 2016 takes in air from these openings 2016a, 2016b and discharges the air toward the back of the main unit cabinet (in the direction indicated by the arrow r1 in FIGS. 7, 8). The air discharged from the fan 2018 in the direction of arrow r1 hits a guide panel 2015 formed diagonally, which guides the air in a slanting downward direction (r2) and the air is discharged outside the cabinet from the exhaust hole 2014 by being directed to flow in the lower diagonal direction toward the back of the main unit cabinet 201. The air discharged outside the cabinet flows divided into the left and right as illustrated by the arrows A, B in FIG. 6 due to the bulges 2012 disposed immediately at the back and flows outside from the bottom of the note PC 100. Incidentally, since there is also space between the bulges 2012 and the floor, the air discharged outside the cabinet from the exhaust hole 2014 flows through the bottom of the bulges 2012 as well to the direction indicated by the arrow C. In this way, the air discharged from the exhaust hole 2014 disperses and flows through several paths from the bottom of the note PC 100.

As described above, in the note PC of the present embodiment, since the exhaust hole 2014 of sufficient width is provided on the undersurface, and the undersurface 2011 is held in a state of being lifted from the floor, especially at the back thereof, it is possible to secure flow path of sufficient width even with the exhaust hole 2014 formed on the undersurface, thereby enough cooling capability is ensured.

Further, since the protrusions are provided, clearance can be secured between the floor surface on which this electronic device is placed and the undersurface of the cabinet especially at the back of the electronic device, thereby flow path of the air discharged from the exhaust hole can be secured. Therefore, the electronic device of the present invention can secure a sufficient cooling capability adequate for the advancement of high functions, miniaturization, and slimness.

It should be noted that, although here, the explanation has been given about the note PC, the technical concept of the present invention is not limited to the note PC, but also can be applied to electronic devices in general equipped with a cooling capability by a fan.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention have been described in detail, it should be understood that the various changes, substitutions, and alterations could be made hereto without departing from the spirit and scope of the invention.

What is claimed is:

1. An electronic device comprising:
   a cabinet including a bottom, the bottom directly facing an external surface in a state in which the electronic device is placed on the external surface;
   a battery disposed at a rear end of the cabinet;
   a fan housed in the cabinet such that at least a part of the fan is arranged forward of the battery and being configured to generate air flow toward the battery;
   an exhaust hole formed on a surface of the bottom between the fan and the battery; and
   a guide disposed in the cabinet between the fan and the battery to guide the airflow to the exhaust hole.

2. The electronic device according to claim 1, further comprising:
   a protrusion that houses the battery and tilts the surface of the bottom for the external surface.

3. The electronic device according to claim 1, wherein the cabinet is a first cabinet equipped with a keyboard on a top face facing the bottom, and the electronic device further comprises a second cabinet with a display screen, which is attached to the first cabinet so as to open and close freely.

4. The electronic device according to claim 1, wherein the second cabinet is attached to the first cabinet at the rear end of the first cabinet so as to open and close freely.

\* \* \* \* \*